(12) United States Patent
Amon

(10) Patent No.: US 6,572,960 B2
(45) Date of Patent: *Jun. 3, 2003

(54) OPAQUE POLYMERIC FILMS AND PROCESSES FOR MAKING THE SAME

(75) Inventor: Moris Amon, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 81 days.

This patent is subject to a terminal disclaimer.

(21) Appl. No.: 09/849,923

(22) Filed: May 4, 2001

(65) Prior Publication Data

US 2002/0187361 A1 Dec. 12, 2002

(51) Int. Cl.$^7$ ............................. B32B 27/32; B32B 3/26
(52) U.S. Cl. ............................ 428/315.9; 428/318.6; 428/319.9; 428/516; 428/910; 264/46.1; 264/46.3; 264/173.15
(58) Field of Search ................................. 428/516, 515, 428/315.9, 318.6, 318.8, 319.9, 910; 264/46.1, 46.3, 173.15

(56) References Cited

U.S. PATENT DOCUMENTS

| | | | | |
|---|---|---|---|---|
| 4,632,869 A | | 12/1986 | Park et al. | 428/315.5 |
| 4,652,489 A | | 3/1987 | Crass et al. | 428/337 |
| 4,758,462 A | | 7/1988 | Park et al. | 428/213 |
| 5,176,953 A | * | 1/1993 | Jacoby et al. | 428/315.5 |
| 5,411,805 A | * | 5/1995 | Magill | 428/220 |
| 5,569,516 A | * | 10/1996 | Paeglis et al. | 156/308.4 |
| 6,171,689 B1 | * | 1/2001 | Kaytor et al. | 428/315.5 |
| 6,183,856 B1 | | 2/2001 | Amon | 428/318.4 |
| 6,194,060 B1 | | 2/2001 | Amon et al. | 428/315.9 |
| 2002/0132869 A1 | * | 9/2002 | Hekal | 521/64 |

* cited by examiner

Primary Examiner—D. Lawrence Tarazano
(74) Attorney, Agent, or Firm—Rick F. James; Keith A. Bell

(57) ABSTRACT

An opaque, oriented polymeric film structure comprising: a core layer comprising a thermoplastic polymeric matrix material wherein the core layer has a first side and a second side, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure, wherein the core layer comprises the interior of the film structure; and a first skin layer comprising a thermoplastic polymeric material and an effective amount of a high-melting incompatible additive to suppress cavitation in said first skin layer, wherein the first skin layer is exterior to the first side of the core layer. In another embodiment, the film structure comprises a second skin layer comprising a thermoplastic polymeric material and an effective amount of a high-melting incompatible additive to suppress cavitation in said second skin layer, wherein the second skin layer is exterior to the second side of the core layer.

23 Claims, 1 Drawing Sheet

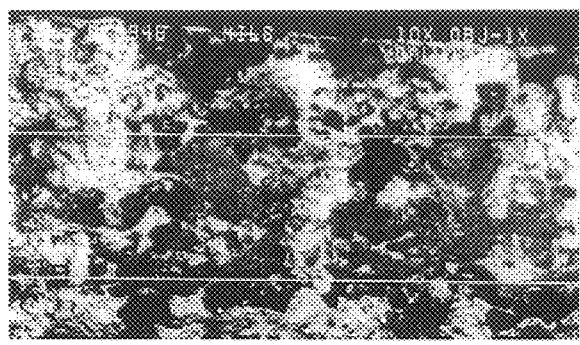
Figure 1
 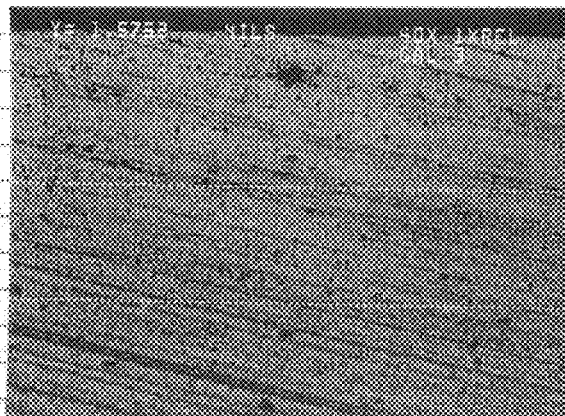
Figure 2A  Figure 2B

US 6,572,960 B2

OPAQUE POLYMERIC FILMS AND PROCESSES FOR MAKING THE SAME

FIELD OF THE INVENTION

The present invention relates to opaque, oriented polymeric films and to processes for making such films. More particularly, the invention relates to opaque, oriented polymeric films comprising a cavitated or voided core layer and at least one smooth outer or skin layer, and to processes for making the same.

BACKGROUND OF THE INVENTION

In the packaging of and labeling of many food and non-food products, it is common practice to use an opaque polymeric film. Often, such opaque polymeric films are multi-layer films comprising a cavitated opaque, thermoplastic polymeric core layer having one or more solid skin layers thereon. The term "cavitated" denotes the presence of numerous microscopic voids. The skin layers contribute various desirable characteristics to the packaging film, such as heat sealability, improved appearance, enhanced machine handling capabilities, and the like.

U.S. Pat. No. 4,632,869 describes a resin combination comprising a thermoplastic polymer matrix having dispersed therein as distinct phases, a multiplicity of small spherical solid particles of polybutylene terephthalate, the resin combination in opaque biaxially oriented polymeric film form, and the same oriented film structure having on at least one surface thereof a void-free thermoplastic skin layer. The process for preparing a biaxially oriented opaque film comprises providing said resin combination, forming an unoriented film of said resin combination and biaxially orienting said film to an extent sufficient to opacify the same. The process also provides for the opaque film having a void-free thermoplastic skin layer on at least one surface thereof. U.S. Pat. No. 4,632,869 is incorporated herein by reference in its entirety U.S. Pat. No. 4,758,462 describes an opaque, biaxially oriented film structure which comprises: an expanded thermoplastic polymer matrix core layer within which is located a minor amount of a light-absorbing pigment and a strata of voids; positioned at least substantially within at least a substantial number of said voids is at least one void-initiating particle which is phase distinct and incompatible with the matrix material, the void space occupied by said particle being substantially less than the volume of said void, with one generally cross-sectional dimension of said particle, at least approximating a corresponding cross-sectional dimension of said void; the population of voids in said core and the thickness of said core being such as to cause a degree of opacity of less than 15% light transmission; and at least one void-free thermoplastic skin layer affixed to a surface of the core layer, said skin layer(s) being of a thickness such that the outer surfaces thereof do not, at least substantially, manifest the surface irregularities of said core layer. U.S. Pat. No. 4,758,462 is incorporated herein by reference in its entirety U.S. Pat. No. 4,652,489 describes a sealable, opaque polyolefinic multilayer film composed of a polypropylene base layer, a non-sealable surface layer, and a sealable surface layer, and process therefor. The sealable surface layer has a low minimum sealing temperature and is made from a copolymer of propylene and ethylene or butene-1 units and/or a terpolymer of ethylene, propylene and butene-1 units. The non-sealable layer is a combination of a propylene homopolymer and a slip agent. The base layer contains an additive which is incompatible with polypropylene. The process includes stretching of the film, and during the stretching step, the polymer matrix is torn open around the additive particles to form vacuoles which give the base layer a degree of opacity. U.S. Pat. No. 4,652,489 is incorporated herein by reference in its entirety.

U.S. Pat. No. 6,183,856 describes a process for making an opaque, oriented polymeric film structure comprising preparing a melt containing a polymeric crystallizable matrix material at a temperature of at least above the melting point of the polymeric matrix material, forming the melt into sheet containing molten polymeric matrix material, cooling the sheet containing molten material to form a sheet containing amorphous polymeric matrix material which contains crystallites of the polymeric matrix material, and forming the sheet, while containing the amorphous polymeric matrix material, into a film by stretching the sheet in at least one direction so as to form voids adjacent to at least some of the crystallites and thereby impart opacity to the film. U.S. Pat. No. 6,183,856 is incorporated herein by reference in its entirety.

Regardless of the method of cavitation employed, if the film consists of a single cavitated layer or if the cavitated layer(s) is/are external, then the cavities or voids may be close to the surface of the film or even break through the surface. Such a film may have a rough surface, which may be aesthetically objectionable in certain applications. When void-initiating particles are the means of cavitation, it is typical to solve this problem by a film structure comprising at least 3 layers, where the outermost 2 layers contain no void-initiating particles and are therefore free of voids. This is the approach of the above mentioned U.S. Pat. Nos. 4,632,869, 4,758,462, and 4,652,489. When the additiveless method of the above-mentioned U.S. Pat. No. 6,183,856 is employed to obtain cavitation, at least two different approaches are possible. One is the subject of U.S. Pat. No. 6,194,060, which is summarized in the next paragraph. The other is the subject of the present invention.

U.S. Pat. No. 6,194,060 describes an opaque, oriented polymeric film structure which comprises: (a) a core layer containing a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and (b) at least one outer or skin layer containing a thermoplastic polymeric material and an effective amount of a nucleating agent to suppress cavitation in said at least one outer or skin layer. The film structure has a smooth surface and can be tailored to provide a controlled permeability. U.S. Pat. No. 6,194,060 is incorporated herein by reference in its entirety.

SUMMARY OF THE INVENTION

The present invention provides an opaque, oriented polymeric film structure comprising: a core layer comprising a thermoplastic polymeric matrix material wherein the core layer has a first side and a second side, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure, wherein the core layer comprises the interior of the film structure; and a first skin layer comprising a thermoplastic polymeric material and an effective amount of a high-melting incompatible additive to suppress cavitation in said first skin layer, wherein the first skin layer is exterior to the first side of the core layer. In another embodiment, the film structure comprises a second skin layer comprising a thermoplastic polymeric material and an effective amount of a high-melting incompatible additive to suppress cavitation in said second skin layer, wherein the second skin layer is exterior to the second side of the core layer.

Advantages of the invention include one or more of the following:

A cavitated thermoplastic film structure having high opacity;

A cavitated thermoplastic film structure having good surface characteristics;

A cavitated thermoplastic film structure which is useful for a variety of applications, including use as packaging films;

A cavitated thermoplastic film structure which is free from, or substantially free from, void-initiating particles;

A cavitated thermoplastic film structure which contains only low amounts of relatively expensive components so as to reduce the material costs in fabricating such films;

A cavitated thermoplastic film structure having a smooth surface;

A cavitated thermoplastic film structure in which the high gas permeability of the film can be controlled and tailored, if desired;

A process for producing a cavitated thermoplastic film structure which has one or more of the aforementioned advantages.

Other embodiments, objects, and advantages of the present invention will be apparent to those skilled in the art upon consideration of the entire present specification, the claims appended hereto, and the accompanying drawings.

BRIEF DESCRIPTION OF THE DRAWINGS

FIG. 1 is a cross-section of a polymeric, uniaxially stretched film structure according to Example 1 (Comparative).

FIGS. 2A and 2B are cross-sections of a polymeric, uniaxially stretched film structure according to Example 2.

DETAILED DESCRIPTION OF THE PREFERRED EMBODIMENTS

The outer or skin layer which provides an opaque, oriented polymeric film structure having a smooth surface in this invention comprises a thermoplastic polymeric material and an effective amount of a high-melting incompatible additive to prevent cavitation therein. In this context, "high-melting" refers to a material that will not melt at or below a temperature at least 20° C. above the melting point of the said thermoplastic material, and "incompatible" refers to a lack of adhesion and solubility between the additive and the thermoplastic material. Surprisingly, although such additives were used in the past to promote cavitation, as in the above-mentioned U.S. Pat. Nos. 4,632,869, 4,758,462, and 4,652,489, they suppress cavitation and minimize the number and size of voids in conjunction with the process of U.S. Pat. No. 6,183,856.

The inclusion of the additive in the film (e.g., in an outer or skin layer) can effectively prevent cavitation even under conditions where cavitation easily occurs in the absence of the additive. As a result, a translucent, minimally cavitated and smooth film layer can be formed. The effect of the additive, as described above, provides an opaque, oriented polymeric film structure having certain advantages. As described above, the use of the additive enables the production of a translucent film layer which, when coextruded with a cavitated film layer, provides a film structure having a smooth surface. In addition, the use of the additive enables the high gas permeability of the porous core to be lowered in a controlled manner according to the needs of the particular application.

In a preferred embodiment, polybutylene terephthalate (PBT) is the above-mentioned additive and polypropylene (PP) is the above-mentioned thermoplastic polymeric material.

The film production process of the present invention preferably comprises:

(a) preparing a melt containing a crystallizable polymeric matrix material at a temperature at least above its melting point;

(b) preparing a melt containing a polymeric material, which may be the same as in step (a), at a temperature at least above its melting point, mixed with solid particles of a high-melting point incompatible additive;

(c) coextruding the melts of steps (a) and (b) into an intermediate film structure comprising a first or core layer from (a) and one or more outer or skin layer(s) from (b);

(d) cooling the coextruded film structure to form a structure comprising a core layer containing amorphous polymeric matrix material and crystallites of the polymeric material, and one or two outer or skin layer(s); and (e) forming the film structure while the core layer contains amorphous polymeric matrix material by stretching the intermediate film structure of step (d) in at least one direction so as to form voids adjacent to at least some of the crystallites in the core layer and thereby impart opacity to the film structure.

The core layer contains a plurality of voids, wherein substantially all of the voids are free from void-initiating particles and at least some of the voids are interconnected with an adjacent void in the polymeric matrix material, and wherein the number of voids not containing a void-initiating particle is sufficient to impart a significant degree of opacity to the film structure. Preferably, none of the voids contain any void-initiating particle. The phrase "significant degree of opacity" means a visible light transmission of less than about 60%.

Once the appropriate core layer material is formulated, it is melted and then extruded into a film sheet. Thereafter, the molten extruded film sheet is suitably cooled into an amorphous state. Of particular significance is that this cooling step is controlled such that crystallization of the polymeric matrix material is initiated but does not proceed more than about 20% towards completion (defined as 100%.) The sheet is promptly stretched while it is in this sub-cooled amorphous state. The well-known phenomenon of stress-induced crystallization accelerates crystal nucleation and growth at this point in time. Microscopic tears are initiated at the crystalline-amorphous phase interfaces because (a) the deformation of the soft matrix is larger than that of the stiff crystallites for a given applied tensile stress, and (b) the polymer becomes denser and contracts locally as it crystallizes. Thus, cavitation or void formation occurs spontaneously within the film sheet during the stretching procedure. After stretching, the resultant film is quenched so as to crystallize the polymeric film matrix as completely as possible. The processes for forming the core layer, as well as the mechanism behind the formation of the voids in the absence, or substantial absence, of void-initiating particles, are described in further detail in U.S. Pat. No. 6,183,856 which is incorporated herein by reference in its entirety.

While not wishing to limit the claims of the present Application by theory, the inventor offers the following hypothesis to explain the experimentally observed cavitation-suppressing effect of the skin layer additive. First, it must be understood that suppression of cavitation is substantial but not complete. In microscope images, small cracks are observed at the interfaces of the additive particles and the matrix, as will be seen in Example 2 below. However, unlike the conventional process exemplified by U.S. Pat. Nos. 4,632,869, 4,758,462, and 4,652,489, where additive particles generate numerous closely spaced voids, these cracks are distant from each other in relation to their own size and do not grow large enough to generate substantial opacity or to roughen the external surface of the film layer where they are present. This is because in the present invention, the concentration of the additive may be much lower than in the conventional process. The micro-cracks initiated at the surfaces of the additive particles serve to relieve the stress in the amorphous phase of the thermoplastic matrix, and therefore, the critical stress for tearing of the amorphous-crystalline interface is not reached. It is presumed that the additive-amorphous phase interfaces are weaker than the crystallite-amorphous phase interfaces, and therefore, the former tear first, relieving stresses down to a level where the latter can no longer tear.

In the present invention, the cavitation-suppressing additive is usually incorporated in a thermoplastic polymeric film layer other than the core layer. Specifically, this additive may be incorporated in an outer or skin layer of the film structure. Hence, this process enables the prevention of a rough film structure surface, which can be formed by undesirable cavitation very close to the film structure surface.

The polymeric matrix material of the opaque film core of the present invention may be primarily composed of a wide variety of polymeric materials which crystallize. In particular, suitable polymeric materials have a crystallization rate such that the material may be cooled to an amorphous state without significant crystallization in an industrial operation, but can thereafter be crystallized from the amorphous state upon stretching. The crystallization rate is neither so slow that the subject processes cannot be practiced economically on an industrial scale, nor so fast that the outer strata of the film structure are fully crystallized by the time its center is cooled down to the target temperature. Polymeric materials having a crystallization rate approximating that of polypropylene are particularly suitable. Also, the polymeric matrix material, after being subjected to the processes of the present invention, preferably results in an opaque film which exhibits a significant degree of crystallinity such as, for example, in one embodiment at least about 30%, and in a second embodiment at least about 50%.

Specifically, the polymer matrix material of the core layer may include one or more polyolefins alone or in conjunction with other polymeric materials which satisfy the above condition. Exemplary polyolefins include homo- and co-polymers of propylene, ethylene, butene, and other olefins, and blends thereof. Other suitable polymers include, but are not limited to, halogenated polyolefins, polyesters, polyethers, and polyamides, and isotactic polypropylene having an isotacticity index of at least about 80% by weight, preferably about 95 to 100%, as measured by determining the amount of insolubles in xylene.

It is further contemplated that one or more additives such as pigments, fillers, antioxidants, antistatic agents, slip agents, anti-tack agents, absorbents, and the like can be optionally included in optimum amounts in the core layer of the film structure.

In one embodiment, the core layer comprises at least about 50% by weight of the film structure, in another embodiment at least about 70% by weight of the film structure, and in a last embodiment at least about 90% by weight of the film structure.

With respect to the outer or skin layer, which may be formed on one or more surfaces of the core layer by coextrusion or the like, the thermoplastic polymer material contained therein may be the same as or different from the polymer(s) in the core layer.

The outer or skin layer may be an encapsulating layer, a heat sealable layer, or the like. The thickness of the outer or skin layer may be varied according to the desired end use, appearance, properties (e.g., gas barrier properties), and the like. Preferably, the combined thickness of the outer or skin layers is about 5 to 70% of the overall thickness of the film structure, which has a preferred thickness of about 0.5 mil to 30 mils. Further, at least one other outer or skin layer, or some other coating or layer, may be formed on the surface of the outer or skin layer. It should be noted that the outer or skin layer can be transparent or pigmented, and can be of the same or different material as the polymeric matrix material of the core layer.

To enhance the opacity, whiteness, and low light transmission of the film structure, a pigment such as titanium dioxide may be added in a preferred amount of about 1 to about 12% by weight to the melt mixture forming the core or outer skin layer(s) prior to extrusion. The whiteness allows printing without the use of white ink.

The processability and machinability of the film structure may be enhanced by the addition of a small amount of a finely divided inorganic material in the polymeric material of the outer or skin layer. Such inorganic materials can not only impart anti-block properties to the film structure, but can also reduce the coefficient of friction of the resulting film structure. Suitable finely divided inorganic materials include syloid, a synthetic amorphous silica gel containing primarily silica, diatomaceous earth having particles which are porous and irregularly shaped, dehydrated kaolinite which particles are thin, flat platelets, and synthetic precipitated silicates in which the particles are porous and irregularly shaped. Such particles generally have a particle size of about 1 to 10 microns.

As in the case of the polymeric matrix material of the first or core layer, other additives such as fillers, antioxidants, antistatic agents, slip agents, anti-tack agents, absorbents, and the like can be included in the outer or skin layer(s) in optimum amounts.

The cavitation suppressing additive of the skin layer can be chosen from a wide variety of materials, provided it melts at a temperature at least 20° C. higher than the above-mentioned thermoplastic polymer material and is incompatible with it. In particular, when the thermoplastic polymer material is PP, polybutylene terephthalate (PBT) may be used. PBT, also known as polytetramethylene terephthalate (PTMT) is a highly crystalline polymer obtained from the polycondensation of dimethyl terephthalate with 1,4-butanediol. PBT has a melting point of 430° F., compared to about 320° F. for homo-polypropylene (PP). The 110° F. difference is well in excess of the minimal 20° C.=36° F. difference specified above. Although the range of amounts of the PBT may vary depending on the types of thermoplastic polymer material and PBT selected, in one embodiment, the range of amounts is from about 0.5 to about 3 wt % of PBT in PP, and in another embodiment from about 0.5 to about 1 wt % of PBT in PP, based on the total weight of the outer or skin layer. Other cavitation suppressing additives which may be suitable in conjunction with PP for the purposes of this invention include polyesters other than PBT, polyamides (nylons), cyclic olefin copolymers such as norbornene-ethylene copolymers, and inorganic powders such as calcium carbonate. Some of the foregoing additives or others may be suitable in conjunction with thermoplastic polymer materials other than PP. In one embodiment the range of amounts of the cavitation suppressing additives is from about 0.5 to about 3 wt % of cavitation suppressing additives, and in another embodiment from about 0.5 to about 1 wt % of cavitation suppressing additives, based on the total weight of the outer or skin layer.

It is contemplated that the film structure may comprise multiple layers. At a minimum the film structure comprises a core layer having a first side and a second side that comprises the interior of the film structure; and a first skin layer, wherein the first skin layer is exterior to the first side of the core layer. In another embodiment, the film structure comprises a core layer having a first side and a second side that comprises the interior of the film structure; a first skin layer, wherein the first skin layer is exterior to the first side of the core layer; and a second skin layer wherein the second skin layer is exterior to the second side of the core layer. In another embodiment, additional layers are added to the film structure between the core layer and the first skin layer. In another embodiment, additional layers are added to the film structure between the core layer and the second skin layer. In another embodiment, additional layers are added to the film structure exterior to the first skin layer. In another embodiment, additional layers are added to the film structure exterior to the second skin layer. In addition, combinations of the additional layers of the aforementioned embodiments are contemplated by the inventor.

In general, stretching of the films is not particularly limited, and may comprise uniaxial or biaxial stretching. If biaxial stretching is performed, it is preferably conducted sequentially, although simultaneous stretching in both the machine and transverse directions is also contemplated. As the particular materials used in forming the films may vary, the conditions and degree of orientation or stretching may be altered accordingly to achieve the desired results. Generally, a machine direction orientation of about 4 to about 8 times and a transverse direction orientation of from about 4 to about 10 times yield polyolefin film structures having satisfactory characteristics including opacity.

Certain components of conventional equipment typically used for orienting polymeric films may be utilized in the processes of the present invention. For example, longitudinal or machine direction stretching may be advantageously conducted using two rolls running at different speeds according to the desired stretching ratio, and transverse stretching may be conducted using an appropriate tenter frame. It should be recognized that even uniaxial stretching such as created by drawing rolls results in biaxial stress since contraction of the sheet in the transverse direction which would normally occur is prevented by adhesion between the roll and the sheet.

After stretching and consequent formation of voids within the core layer, the film structure may be subjected to a heat treatment for annealing for a short period up to about 10 seconds or more. Additionally, one or more of the outer surfaces of the film structure of the present invention may be treated to improve their surface energy such as by, for example, chlorination, oxidation, plasma, flame or corona discharge treatment. Such surface treatments can improve the adhesion of the film structure to metal layers, inks and/or other coating or laminating materials. Thereafter, the film structure may be wound up in a conventional manner using a wind-up device.

The opaque thermoplastic polymeric film structures of the present invention may be used for a variety of purposes, either alone or in conjunction with other structures such as coatings, coextruded film layers of the same or different composition, adhered film layers of the same or different composition, and the like. In particular, the opaque film structures of the present invention may be tailored to have substantial gas permeation rates such that the films can be considered to be essentially porous. Thus, the opaque film structures of the present invention are suitable as "breathable" films for certain packaging and medical applications where gas transmission is desirable. The film structures of the present invention may be used as permeation control devices.

The porous nature of the film core according to an aspect of the present invention is in distinct contrast to other opaque films. In the usual embodiment of the present invention, many of the voids in the core layer have openings extending between adjacent voids such that paths permitting gases or liquids to traverse from one side of the film to the other exist. In addition, portions of the walls between adjacent voids may be extremely thin, and thus, there is diffusion of gases from one void to another, further contributing to the high gas transmission rate characteristics. However, the skin layer(s) containing a cavitation suppressing additive (in one embodiment PBT) is (are) largely non-porous, and by adjusting its (their) thickness, one may achieve a degree of control on overall film permeability The following examples illustrate the present invention:

EXAMPLE 1 (COMPARATIVE)

Homo-polypropylene (PP) resin, having a melting point of about 320° F., a crystallinity of about 60% (by differential scanning calorimetry), and a melt flow rate of about 3.5 (per ASTM method D1238, at 230° C. and 2,160 g load), and sold by Fina under the trade name Fina 3371 was extruded through a laboratory film extrusion system. There was no additive in the resin other than a minimal amount of antioxidant added by the supplier.

One main extruder, with a screw diameter D of 1.25" and a length/diameter ratio L/D of 24, and three coextruders, each with a D of 1.0" and L/D of 24, were used concurrently to melt and pump the same polymer. The main extruder had four heater zones, and they were set at 375, 425, 425, and 425° F., from feed to exit. The coextruders had three heating zones, and they were all set at 375, 425, and 425° F. from feed to exit. The four extruders were connected by short melt pipes to an adapter and manifold block combining the outputs of the extruders into an A/B/D/C layer structure, where B refers to the layer from the main extruder and A, C and D to the layers from the co-extruders. The die had a single coat-hanger type cavity, and exit gap and width of 0.060 and 6 in, respectively. The melt pipe, adapter manifold block, and die temperatures were all set at 400° F. The molten sheet temperature was about 400° F. at the die lip, as measured by an infrared (IR) pyrometer.

The extruded sheet was contacted on alternating sides by a series of five 6.0" diameter rolls with centers arranged on a horizontal straight line at 6.75" spacing, except for the third-fourth roll center spacing, which was adjustably set to 6.14 in. The top of the first roll was approximately 0.5" above the die lip. Roll heat transfer fluid temperatures were controlled at about 200, 245, 245, 255, and 255° F., successively. The first three rolls turned at a surface speed of 2.1 ft/min, and the last two at 10.5 ft/min, thus providing a machine direction (MD) stretch ratio of 5.0. The first two rolls had chromed steel shells whereas the last three were rubber clad to prevent slippage during MD stretching.

The MD-stretched sheet was taken into a tenter oven at about 10 ft/min. The oven was heated by planar IR radiant heaters placed above and parallel to the film plane. The tenter had a parallel-rail preheat zone 11" long, followed by a diverging-rail transverse direction (TD) stretch zone 56" long, and finally a parallel-rail annealing zone 50" long. The mechanical TD stretch ratio was 5, but true local TD stretch ratio at the web center was determined as 7.9 (by making pen marks TD-spaced 1.0" on the sheet at the tenter entrance and measuring the TD spacing of these marks at the tenter exit.) Web temperature reached an estimated maximum of 240° F. in the stretch zone (based on a separate set of IR pyrometer measurements.) After the tenter, the thick edge tapes were slit off, and the finished film was wound on a pneumatic winder.

The PP sheet could be seen to turn from transparent to white-opaque over a well-defined and narrow region between the third (slow) and fourth (fast) roll. Microscopic examination of the MD-stretched sheet showed a relatively coarse porous structure, as shown in FIG. 1. The cavities broke through the surface in many places, producing a rough surface appearance and feel.

Oxygen and water vapor permeabilities were measured according to ASTM test methods D3985 and E96, respectively. These are listed in Table 1, together with the results of Examples 3 and 4 to be discussed later. The first value listed in each cell of Table 1 is an average; the ±deviation indicates the range. The original raw data were analyzed by standard statistical methods, including the steps of: (1) data transformation for variance stabilization; (2) analysis of variance; and (3) verification of underlying assumptions. In summary, it was determined that all of the relevant differences in Table 1 are statistically significant, and cannot be attributed to chance, even though the random variance is quite large in places.

For reference, typical oxygen and water vapor permeabilities of clear uncavitated biaxially oriented PP are 150 scc.mil/atm.day.100 in$^2$ and 0.4 g.mil/day.100 in$^2$, respectively. It is seen that much greater permeabilities are obtained in Experiment 1. This is due to the porous nature of the film. This characteristic renders the film useful for packaging applications where high gas transport rates are desirable, such as fresh fruit and vegetable packaging.

TABLE 1

| Example number and brief description | Oxygen permeability scc · mil/ atm · day · 100 in$^2$ | Water vapor permeability g · mil/day · 100 in$^2$ |
|---|---|---|
| 1) No nucleating agent | 28000 ± 22000 | 12 ± 7 |
| 3) PBT in C layer only | 1480 ± 4 | 4.6 ± 0.9 |
| 4) PBT in C and D | 751 ± 47 | 1.3 ± 0.5 |

EXAMPLE 2

A blend of 1 weight % PBT pellets and 99% PP pellets was prepared. The PBT used was Celanese 1300A, which has an intrinsic viscosity of 0.70, and the PP was the above-mentioned Fina 3371. The pellet blend was melt-compounded in a separate twin-screw extruder at temperatures high enough to melt and disperse the PBT. The resulting molten mixture was extruded as strands about 1 mm in diameter, which were immediately cut into pellets by a rotating knife.

Film was produced with the above 1% PBT+99% PP compound in all four layers on the same equipment and under the same conditions as cited in Example 1. This film showed minimal "lofting"—that is, expansion due to cavitation. Machine direction (MD) and transverse direction (TD) cross-sections of the MD-stretched sheet are shown in FIG. 2a and 2b, respectively. Small, slit-like holes, separated by large distances in relation to their own size are seen. For a film thickness of 1.3 mil, light transmission was about 78%, and density 0.89 g/cc. Both values are much higher than those typical of conventional white opaque film. In fact, judging from the appearance of the unstretched base sheet, it is likely that most of the opacity is due to the effect of the PBT particles, with minimal contribution from voids. WVTR was 0.26±0.03 g/100 in$^2$.day for thickness in the range of 1.25 to 1.94 mil. This is comparable to non-cavitated oriented polypropylene film.

EXAMPLE 3

Film was produced on the equipment and under the process conditions of Example 1, with the 1% PBT+99% PP compound of Example 2 in outer skin layer C. A smooth, pearlescent skin was obtained on one the face of the film corresponding to the C layer.

EXAMPLE 4

Film was produced on the equipment and under the process conditions of Example 1, with the 1% PBT+99% PP compound of Example 2 in outer skin layer C and adjacent intermediate layer D, and neat PP in layers A and B. The appearance of the film was similar to that described in Example 3.

The difference between the present Example and Example 3 is in the thickness of the PBT-containing, sparsely cavitated outer layer. Based on extruder output rates, this layer constitutes 18% of the total film mass in the present Example vs 6% in Example 3. The effect of the presence and thickness of the skin is seen in Table 2. Compared to the baseline case of Example 1, introduction of the relatively thin non-porous skin of Example 3 drastically reduces oxygen and water vapor permeabilities. There is a further decrease when the non-porous skin is thickened in Example 4.

These data show that PBT can be used to control the permeability of porous films at desired high levels by the agency of a relatively void-free skin layer.

What is claimed is:

1. An opaque, oriented polymeric film structure comprising:
    (a) a core layer comprising a thermoplastic polymeric material wherein the core layer has a first side and a second side, the core layer having a plurality of voids, with at least substantially all of the voids being free from a void-initiating particle and at least some of the voids being interconnected with an adjacent void in the polymeric material, and wherein the number of voids being free from a void-initiating particle is sufficient to result in the polymeric film structure having a
    (b) visible light transmission of less than about 60%, and wherein the core layer comprises the interior of the film structure; and (c) a first skin layer comprising a thermoplastic polymeric material and from about 0.5 to about 3.0 wt. % of a cavitation suppressing additive, and wherein the first skin layer is exterior to the first side of the core layer.

2. The opaque, oriented polymeric film structure according to claim 1, wherein the thermoplastic polymer of the core layer comprises at least one polyolefin.

3. The opaque, oriented polymeric film structure according to claim 2, wherein the at least one polyolefin of the core layer is selected from the group consisting of ethylene polymers, polypropylene, polybutylene, block copolymers of ethylene and propylene, random copolymers of ethylene and propylene, and mixtures thereof.

4. The opaque, oriented polymeric film structure according to claim 1, wherein the thermoplastic polymer of the first skin layer comprises at least one polyolefin.

5. The opaque, oriented polymeric film structure according to claim 4 wherein the at least one polyolefin of the first skin layer is selected from the group consisting of ethylene polymers, polypropylene, polybutylene, block copolymers of ethylene and propylene, random copolymers of ethylene and propylene, and mixtures thereof.

6. The opaque, oriented polymeric film structure according to claim 1, further comprising a second skin layer comprising a thermoplastic polymeric material and from about 0.5 to about 3.0 wt. % of a cavitation suppressing additive, and wherein the second skin layer is exterior to the second side of the core layer.

7. The opaque, oriented polymeric film structure according to claim 6, wherein the thermoplastic polymer of the second skin layer comprises at least one polyolefin.

8. The opaque, oriented polymeric film structure according to claim 7, wherein the at least one polyolefin of the second skin layer is selected from the group consisting of ethylene polymers, polypropylene, polybutylene, block copolymers of ethylene and propylene, random copolymers of ethylene and propylene, and mixtures thereof.

9. The opaque, oriented polymeric film structure according to claim 1, wherein the cavitation suppressing additive is present in the amount of from about 0.5 to about 1.0% by weight, based on the total weight of the first skin layer.

10. The opaque, oriented polymeric film structure according to claim 1, wherein the cavitation suppressing additive is comprised of a material selected from the group consisting of polyesters, polyamides, cyclic olefin copolymers, and inorganic powders.

11. The opaque, oriented polymeric film structure according to claim 1, wherein the cavitation suppressing additive comprises PBT.

12. The opaque, oriented polymeric film structure according to claim 11 wherein the thermoplastic polymeric material of the core layer comprises polypropylene.

13. An opaque, oriented polymeric film structure comprising:
(a) a core layer comprising a thermoplastic polymeric material wherein the core layer has a first side and a second side, the core layer having a plurality of voids, with at least substantially all of the voids being free from a void-initiating particle and at least some of the voids being interconnected with an adjacent void in the polymeric material, and wherein the number of voids being free from a void-initiating particle is sufficient to result in the polymeric film structure having a visible light transmission of less than about 60%, and wherein the core layer comprises the interior of the film structure; and
(b) a first skin layer comprising a thermoplastic polymeric material and from about 0.5 to about 1.0 wt. % of PBT, and wherein the first skin layer is exterior to the first side of the core layer.

14. A process for making an opaque, oriented film structure comprising:
(a) preparing a core layer melt mixture comprising a thermoplastic polymeric material;
(b) preparing at least one skin layer melt mixture comprising a thermoplastic polymeric material and from about 0.5 wt. % to about 3.0 wt. % of a cavitation suppressing additive;
(c) coextruding the core layer melt mixture and the at least one skin layer melt mixture to form a coextrudate comprising a core layer and a skin layer;
(d) cooling the coextrude to a temperature where the core layer is about 20% or less crystallized; and
(e) orienting the cooled extrudate in at least one direction to form voids in the core layer.

15. The process according to claim 14, wherein the cavitation suppressing additive comprises a material selected from the group consisting of polyesters, polyamides, cyclic olefin copolymers, and inorganic powders.

16. The process according to claim 14, wherein the cavitation suppressing additive is PBT.

17. The process according to claim 16, wherein the PBT is present at a concentration of from about 0.5 wt. % to about 1.0 wt. % of the skin layer melt mixture.

18. A process for making an opaque, oriented film structure according to claim 17, further comprising subjecting the extrudate to a thermal conditioning step before orienting the extrudate wherein multiple rolls are used to thermally condition the film structure in the machine direction.

19. An opaque, film structure having a visible light transmission of less than about 60% and a voided core layer produced by a method comprising:
(a) preparing a core layer melt mixture comprising a thermoplastic polymeric material;
(b) preparing at least one skin layer melt mixture comprising a thermoplastic polymeric material and from about 0.5 wt. % to about 3.0 wt. % of a cavitation suppressing additive;
(c) coextruding the core layer melt mixture and the at least one skin layer melt mixture to form a coextrudate comprising a core layer and a skin layer;
(d) cooling the coextrude to a temperature where the core layer is about 20% or less crystallized; and
(e) orienting the cooled extrudate in at least one direction to form voids in the core layer.

20. The polymeric film structure according to claim 19, wherein the cavitation suppressing additive comprises a material selected from the group consisting of polyesters, polyamides, cyclic olefin copolymers, and inorganic powders.

21. The polymeric film structure according to wherein the cavitation suppressing additive is PBT.

22. The polymeric film structure according to claim 21, wherein the PBT is present at a concentration of from about 0.5 wt. % to about 1.0 wt. % of the skin layer melt mixture.

23. The polymeric film structure according to claim 22, wherein the method for producing the film further comprises subjecting the extrudate to a thermal conditioning step before orienting the extrudate, wherein multiple rolls are used to thermally condition the film structure in the machine direction.

* * * * *